US012592404B2

(12) United States Patent
Baumann et al.

(10) Patent No.: US 12,592,404 B2
(45) Date of Patent: Mar. 31, 2026

(54) HUMIDIFIER

(71) Applicant: MAHLE International GmbH, Stuttgart (DE)

(72) Inventors: Michael Baumann, Ammerbuch (DE); Sven Alexander Kaiser, Waiblingen (DE)

(73) Assignee: Mahle International GmbH (DE)

( * ) Notice: Subject to any disclaimer, the term of this patent is extended or adjusted under 35 U.S.C. 154(b) by 333 days.

(21) Appl. No.: 18/288,805

(22) PCT Filed: Apr. 8, 2022

(86) PCT No.: PCT/EP2022/059419
§ 371 (c)(1),
(2) Date: Oct. 27, 2023

(87) PCT Pub. No.: WO2022/228868
PCT Pub. Date: Nov. 3, 2022

(65) Prior Publication Data
US 2025/0087726 A1     Mar. 13, 2025

(30) Foreign Application Priority Data

Apr. 28, 2021     (DE) ..................... 10 2021 204 247.3

(51) Int. Cl.
| | |
|---|---|
| *B01D 63/02* | (2006.01) |
| *B01D 63/08* | (2006.01) |
| *H01M 8/04119* | (2016.01) |

(52) U.S. Cl.
CPC ........ *H01M 8/04149* (2013.01); *B01D 63/02* (2013.01); *B01D 63/082* (2013.01); *H01M 8/04141* (2013.01)

(58) Field of Classification Search
CPC .. B01D 63/02; B01D 63/082; B01D 2313/04; B01D 2313/06; B01D 2313/2031;
(Continued)

(56) References Cited

U.S. PATENT DOCUMENTS

| | | | |
|---|---|---|---|
| 4,936,988 A | 6/1990 | Lueck | |
| 2011/0129740 A1* | 6/2011 | Koo .................. | H01M 8/04126 |
| | | | 429/413 |

(Continued)

FOREIGN PATENT DOCUMENTS

| | | |
|---|---|---|
| DE | 3912741 A1 | 12/1989 |
| DE | 102014006394 A1 | 11/2015 |
| DE | 102019123534 A1 | 3/2021 |

OTHER PUBLICATIONS

English abstract for DE-102014006394.
English abstract for DE-102019123534.

*Primary Examiner* — Frank M Lawrence, Jr.
(74) *Attorney, Agent, or Firm* — Fishman Stewart PLLC

(57) ABSTRACT

A humidifier for humidifying a dry cathode supply air via a moist cathode exhaust air in a fuel cell system is disclosed. The humidifier may include a housing, a membrane stack, two opposing sealing plates, and a support frame. The membrane stack may be arranged in and insertable into the housing interior in a longitudinal direction. Two opposing side surfaces of the membrane stack may be hermetically sealed. Dry cathode supply air in a supply air flow path and moist cathode exhaust air in an exhaust air flow path may be flowable through the membrane stack free of mixing. The two sealing plates may each be connected to an associated side surface of the membrane stack and may contact the housing in a sealing manner such that two air chambers are separated in an airtight manner transversely to a circulation direction extending around the longitudinal direction.

20 Claims, 7 Drawing Sheets

(58) Field of Classification Search
CPC ............ B01D 2313/21; B01D 2313/22; B01D
2053/22; B01D 2053/227; Y02E 60/50;
H01M 8/04149; H01M 8/04141
USPC .................................................... 95/52; 96/7
See application file for complete search history.

(56) References Cited

U.S. PATENT DOCUMENTS

| | | | |
|---|---|---|---|
| 2012/0181712 A1* | 7/2012 | Vanderwees ...... | H01M 8/04141 |
| | | | 261/102 |
| 2015/0162627 A1 | 6/2015 | Fasold | |
| 2015/0273405 A1 | 10/2015 | Henderson | |
| 2016/0079616 A1 | 3/2016 | Lee | |
| 2016/0322655 A1* | 11/2016 | Staeck .............. | H01M 8/04141 |
| 2022/0115678 A1* | 4/2022 | Staeck ................. | B01D 63/081 |
| 2023/0018380 A1* | 1/2023 | Kaiser ................ | H01M 8/2465 |

* cited by examiner

HUMIDIFIER

CROSS-REFERENCE TO RELATED APPLICATIONS

This application claims priority to International Patent Application No. PCT/EP2022/059419, filed on Apr. 8, 2022, and German Patent Application No. DE 10 2021 204 247.3, filed on Apr. 28, 2021, the contents of both of which are hereby incorporated by reference in their entirety.

TECHNICAL FIELD

The invention relates to a humidifier for humidifying a dry cathode supply air by means of a moist cathode exhaust air in a fuel cell system.

BACKGROUND

A humidifier is used in a fuel cell system for humidifying a dry cathode supply air by means of a moist cathode exhaust air. The fuel cell system can be used in particular for the drive of vehicles. A generic humidifier usually comprises here a housing and a membrane stack, which is received in the housing and has a plurality of stacked membranes spaced apart with respect to one another. Between the adjacent membranes of the membrane stack, channels are formed, which are flowed through in an alternating manner by the cathode supply air and the cathode exhaust air. The membranes here are impermeable to air and permeable to water vapour, so that the cathode supply air and the cathode exhaust air are separated by the membranes and nevertheless, the cathode supply air can be humidified through the membranes with the cathode exhaust air. It is known for example from DE 10 2014 006 394 A1 to separate the cathode supply air and the cathode exhaust air in the housing of the humidifier in an airtight manner by a plurality of seals. Disadvantageously, the humidifier is thereby constructed in a very complex manner.

SUMMARY

It is therefore the object of the invention to indicate an improved or at least alternative embodiment for a humidifier of the generic type, in which the described disadvantages are overcome.

This problem is solved according to the invention by the subject matter of the independent claim(s). Advantageous embodiments are the subject matter of the dependent claim(s).

A humidifier is provided for humidifying a dry cathode supply air by means of a moist cathode exhaust air in a fuel cell system. The humidifier has a housing with a housing interior and a membrane stack arranged in the housing interior. The membrane stack has here six side surfaces and can be inserted into the housing interior of the housing in the longitudinal direction. Two of the opposing side surfaces of the membrane stack are hermetically sealed here. Two further of the opposing side surfaces of the membrane stack are able to be flowed through in a supply air flow path by the dry cathode supply air, and two further of the opposing side surfaces of the membrane stack are able to be flowed through in an exhaust air flow path by the moist cathode exhaust air, free of mixing. Between the respective side surface of the membrane stack, which is able to be flowed through, and the housing, an air chamber is respectively formed for supplying or discharging the cathode supply air in the supply air flow path or for supplying or discharging the cathode exhaust air in the exhaust air flow path to/from the membrane stack. According to the invention, two of the side surfaces of the membrane stack which are able to be flowed through are aligned transversely to the longitudinal direction and are able to be flowed through in the longitudinal direction, and two other of the side surfaces of the membrane stack which are able to be flowed through are aligned parallel to the longitudinal direction and are able to be flowed through transversely to the longitudinal direction. The side surfaces of the membrane stack which of the membrane stack which are not able to be flowed through are then aligned accordingly parallel to the longitudinal direction.

The membrane stack has a plurality of membranes, wherein the membranes of the membrane stack, due to the arrangement according to the invention of the side surfaces of membrane stack, which are able to be flowed through, in the housing are stacked transversely to the longitudinal direction, spaced apart from one another. Advantageously, the membranes can be configured as flat membranes. Advantageously, the membranes can be configured to be very thin, preferably in a foil-like manner. Supply air channels and exhaust air channels are formed here between the individual membranes. The supply air channels are associated with the supply air flow path and connect to one another in an air-conducting manner a first pair of the opposing side surfaces of the membrane stack which are able to be flowed through. The exhaust air channels are associated with the exhaust air flow path and connect to one another in an air-conducting manner a second pair of the opposing side surfaces of the membrane stack which are able to be flowed through. Expediently, the supply air channels are separated from the second pair of the side surfaces, and the exhaust air channels are separated from the first pair of the side surfaces in an airtight manner. Expediently, the two side faces of the membrane stack which are not able to be flowed through are hermetically sealed. The membranes of the membrane stack are airtight and permeable to water vapour, so that the cathode supply air and the cathode exhaust air flow through the membrane stack free of mixing, and the cathode supply air is humidified through the membranes with the cathode exhaust air. The term "permeable to water vapour" means here and further that the membranes of the membrane stack are permeable for the water vapour, and the water vapour can pass from the cathode exhaust air through the membranes to the cathode supply air.

The longitudinal direction of the humidifier according to the invention is defined here by the direction in which the membrane stack is inserted into the housing. The membrane stack can preferably be cuboid-shaped and a longitudinal axis of the membrane stack can be aligned in the longitudinal direction. Advantageously, longest edges of the membrane stack can be aligned in the longitudinal direction. The side surfaces which are able to be flowed through and are aligned transversely to the longitudinal direction, and the side surfaces which are able to be flowed through and are aligned parallel to the longitudinal direction can have geometric areas which differ from one another. The supply air flow path lying within the membrane stack and the exhaust air flow path lying within the membrane stack can have lengths differing from one another.

The housing can have here a housing body which is open on one side or respectively is pot-shaped or respectively bucket-shaped, with a base and with a closure lid. The housing body or respectively the longitudinal centre axis of the housing body is then aligned in the longitudinal direction, and the base and the closure lid are aligned transversely to the longitudinal direction. The side surfaces which are able to be flowed through and are aligned transversely to the longitudinal direction are then arranged respectively facing the base and the closure lid. Alternatively, the housing can have a housing body which is open on both sides or respectively is tubular, with two closure lids. The housing body or respectively the longitudinal centre axis of the housing body is then aligned in the longitudinal direction, and the respective closure lids are aligned transversely to the longitudinal direction. The side surfaces which are able to be flowed through and are aligned transversely to the longitudinal direction are then arranged respectively facing the respective closure lid. The cross-section of the tubular or pot-shaped housing body transversely to the longitudinal direction here can be round or oval or polygonal or rhombic or rectangular or square.

In the humidifier according to the invention, the sealing of the air chambers associated with the side surfaces of the membrane stack which are able to be flowed through and are aligned transversely to the longitudinal direction, can take place advantageously transversely to the longitudinal direction and thereby in a simplified manner. In particular, conventional sealing windows, aligned in the longitudinal direction, in the housing can be dispensed with. Thereby, the number of undercuts in the housing and accordingly also the number of sliders in the production of the housing can be reduced. By the arrangement of the side surfaces of the membrane stack, which are able to be flowed through, in the housing, the structure of the humidifier as a whole can be simplified and the production costs can be reduced.

Advantageously, provision can be made that the membrane stack is cuboid-shaped. A longitudinal axis of the membrane stack and longest edges of the membrane stack are then aligned parallel to the longitudinal direction. The membranes of the membrane stack are stacked spaced apart from one another transversely to the longitudinal direction owing to the arrangement according to the invention of the side surfaces of the membrane stack, able to be flowed through, in the housing. When the longest edges of the membrane block are aligned along the longitudinal direction, the membranes are stacked along the short edge of the membrane stack, aligned transversely to the longitudinal direction. Compared to a conventional membrane stack in which the membranes are stacked in the longitudinal direction and thereby along the longest edge of the membrane stack, the number of membranes which are to be stacked or respectively of the layers which are to be stacked can be reduced. Thereby, the structure of the membrane stack can be simplified, and in addition the cycle time on production of the membrane stack can be advantageously shortened linearly. Accordingly, the production costs of the membrane stack and of the humidifier as a whole can be reduced.

Advantageously, the side surfaces which are able to be flowed through and are aligned transversely to the longitudinal direction can be associated with the supply air flow path. The supply air flow path is then aligned in the longitudinal direction and is able to be flowed through by cathode supply air in the longitudinal direction. Accordingly, the side surfaces which are able to be flowed through and are aligned parallel to the longitudinal direction can be associated with the exhaust air flow path. The exhaust air flow path is then aligned transversely to the longitudinal direction and is able to be flowed through by cathode exhaust air transversely to the longitudinal direction. The moist cathode exhaust air in the exhaust air flow path tends to a higher pressure loss than the dry cathode supply air in the supply air path owing to the condensation of water. When the membrane stack is cuboid-shaped and the longest edges of the membrane stack are aligned in the longitudinal direction, a particularly advantageous through-flow of the membrane stack can be achieved.

In the membrane stack which is aligned in such a way, the side surfaces which are able to be flowed through and are aligned parallel to the longitudinal direction have a greater geometric area than the side surfaces which are able to be flowed through and are aligned transversely to the longitudinal direction. In addition, the flow path lying within the membrane stack between the side surfaces which are able to be flowed through and are aligned parallel to the longitudinal direction is smaller than the flow path lying within the membrane stack between the side surfaces which are able to be flowed through and are aligned transversely to the longitudinal direction. The side surfaces, which are able to be flowed through and are aligned parallel to the longitudinal direction, with a greater geometric area and with a smaller flow path within the membrane stack are accordingly associated with the exhaust air flow path. Thereby, the pressure loss in the cathode exhaust air, which is wet and tending to pressure loss, can be reduced. The side surfaces with a smaller geometric area and with a larger flow path within the membrane stack, which are able to be flowed through and are aligned transversely to the longitudinal direction, are associated with the supply air flow path. As the dry cathode supply air tends to no pressure loss, the smaller geometric area and the larger flow path within the membrane stack are noncritical.

In an advantageous embodiment of the humidifier, provision is made that the humidifier has a support frame. The membrane stack is inserted here in the support frame, and the support frame is inserted in the housing. The side surfaces of the membrane stack which are able to be flowed through are connected here through the support frame with the associated air chambers in an air-conducting manner. The support frame receives the membrane stack securely and sets the membrane stack securely in the housing. Thereby, the mounting of the humidifier can be distinctly simplified. In addition, the sealing of the membrane stack to the housing can take place via the support frame, and thereby in a simplified manner. Advantageously, the support frame can also equalize the tolerances of the membrane stack and of the housing. The support frame is a separate element and can advantageously be formed from plastic. The support frame can advantageously be dimensionally stable. The support frame can advantageously be self-supporting. The support frame can be single-part or multi-part.

Advantageously, the humidifier can have two opposing sealing plates, wherein the sealing plates lie at the side surfaces of the membrane stack which are not able to be flowed through. The respective sealing plate can correspond here in shape and size to the respective side surface which is not able to be flowed through. The side surfaces of the membrane stack which are not able to be flowed through are aligned here in the housing parallel to the longitudinal direction. The respective sealing plate can be additionally connected in a materially bonded and airtight manner—for example glued—to the associated side surface of the membrane stack. Advantageously, the respective sealing plates can be formed on the support frame which was described above.

In addition, provision can be made that the respective sealing plate lies in a sealing manner on the housing. The respective sealing plate can be configured here such that, in operation of the humidifier, it is deformable by the inner operating pressure in the membrane stack and is able to be pressed in a sealing manner onto the housing. Alternatively or additionally, the respective sealing plate can be configured deformably, so that with the presence of the inner operating pressure in the membrane stack, the respective sealing plate is pressed in a sealing manner onto the housing. Thereby, the air chambers which are associated with the two side faces, which are able to be flowed through and are aligned parallel to the longitudinal direction, are separated from one another in an airtight manner transversely to the circulation direction. The circulation direction runs here around the longitudinal direction.

In the housing, the air chambers associated with the side surfaces which are able to be flowed through, and the sealing plates associated with the side surfaces which are not able to be flowed through, alternate in the circulation direction. The sealing plates are connected here in an airtight manner with the membrane stack and with the housing, so that the two air chambers, which are associated with the two side surfaces which are able to be flowed through and are aligned parallel to the longitudinal direction, are separated from one another by the sealing plates in an airtight manner.

Alternatively thereto, provision can be made that at least one sealing rib, aligned in the longitudinal direction, is formed on the respective sealing plate, and the respective sealing rib lies on the housing in a sealing manner. The air chambers, which are associated with the two side surfaces, which are able to be flowed through and are aligned parallel to the longitudinal direction, are thereby separated from one another in an airtight manner transversely to the circulation direction. The circulation direction runs here around the longitudinal direction. As already explained above, the air chambers, which are associated with the side surfaces which are able to be flowed through, and the sealing plates which are associated with the side surfaces which are not able to be flowed through, alternate in circulation direction in the housing. The sealing plates are connected here with the membrane stack in an airtight manner, and the sealing rib lies on the housing in a sealing manner, so that the two air chambers which are associated with the two side surfaces, which are able to be flowed through and are aligned parallel to the longitudinal direction, are separated from one another in an airtight manner by the sealing rib.

Advantageously, the respective sealing plate or the respective sealing rib on the sealing plate are formed such that the respective sealing plate, in operation of the humidifier, is deformable by the inner operating pressure in the membrane stack, and the respective sealing plate or the respective sealing rib is able to be pressed onto the housing in a sealing manner. The membrane stack has a plurality of membranes, wherein the membranes are flexible and can deform in the event of a pressure acting on them. In operation of the membrane stack, the inner operating pressure is higher than the outer pressure, and the membrane stack swells outwards. However, it shall be understood that the change in shape of the membrane stack which is described here is small and does not bring about a change in the function and the structure of the membrane stack and of the humidifier. Through the described change in shape, the respective sealing plate or the respective sealing rib on the sealing plate is pressed onto the housing, and the two air chambers which are associated with the two side surfaces, which are able to be flowed through and are aligned parallel to the longitudinal direction, are reliably separated from one another in an airtight manner. In addition, an elastic seal can be arranged—for example clamped and/or pressed—between the sealing plate or the sealing rib on the sealing plate and the housing. The seal can be formed for example from a hardened adhesive composition.

Advantageously, provision can be made that the humidifier has two elastic ring seals. The respective ring seal runs here around the respective side surface of the membrane stack, which is able to be flowed through and is aligned transversely to the longitudinal direction, on the edge side and is arranged—for example clamped or pressed—in a sealing manner between the housing and the support frame or between the housing and the respective side surface, which is able to be flowed through and is aligned transversely to the longitudinal direction. Thereby, the respective ring seal seals the air chamber, associated with this side surface, from the adjacent air chambers. The respective ring seal can be formed advantageously from a hardened adhesive composition.

Advantageously, the sealing of the membrane stack to the housing can take place in a particularly simple manner only by means of the two ring seals and the two sealing plates—with or without the sealing ribs. Here, the sealing plates or the sealing ribs on the sealing plates separate from one another in an airtight manner the two air chambers, which are associated with the two side surfaces which are able to be flowed through and are aligned parallel to the longitudinal direction. The two ring seals then separate the two air chambers, which are associated with the two side surfaces which are able to be flowed through and are aligned transversely to the longitudinal direction, in an airtight manner from the air chambers which are associated with the two side surfaces which are able to be flowed through and are aligned parallel to the longitudinal direction. Thereby, as a whole, a reliable sealing of the membrane stack towards the housing is made possible, and the complexity of the humidifier and the number of individual parts are distinctly reduced.

In an advantageous embodiment of the humidifier, provision is made that the housing has a housing body which is open on both sides transversely to the longitudinal direction, and two closure lids. The housing body is accordingly tubular, wherein its cross-section transversely to the longitudinal direction can be round or oval or polygonal or rhombic or rectangular or square. The housing body is then hermetically sealed by means of the closure lid respectively axially at the longitudinal end. Advantageously, the housing body and the respective closure lid can be screwed to one another. Alternatively, the housing can have a housing body which is open on one side transversely to the longitudinal direction, and a closure lid. The housing body is accordingly pot-shaped or respectively bucket-shaped, wherein its cross-section transversely to the longitudinal direction can be round or oval or polygonal or rhombic or rectangular or square. The housing body is hermetically sealed by means of the closure lid axially at the longitudinal end side. Advantageously, the housing body and the closure lid can be screwed to one another.

Advantageously, the humidifier can have an elastic circulating seal for the respective closure lid, wherein the circulating seal is arranged in a sealing manner—for example clamped and/or pressed—between the housing body and the respective closure lid. The circulating seal can be formed for example from a hardened adhesive composition.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically.

DETAILED DESCRIPTION

Figure 1:
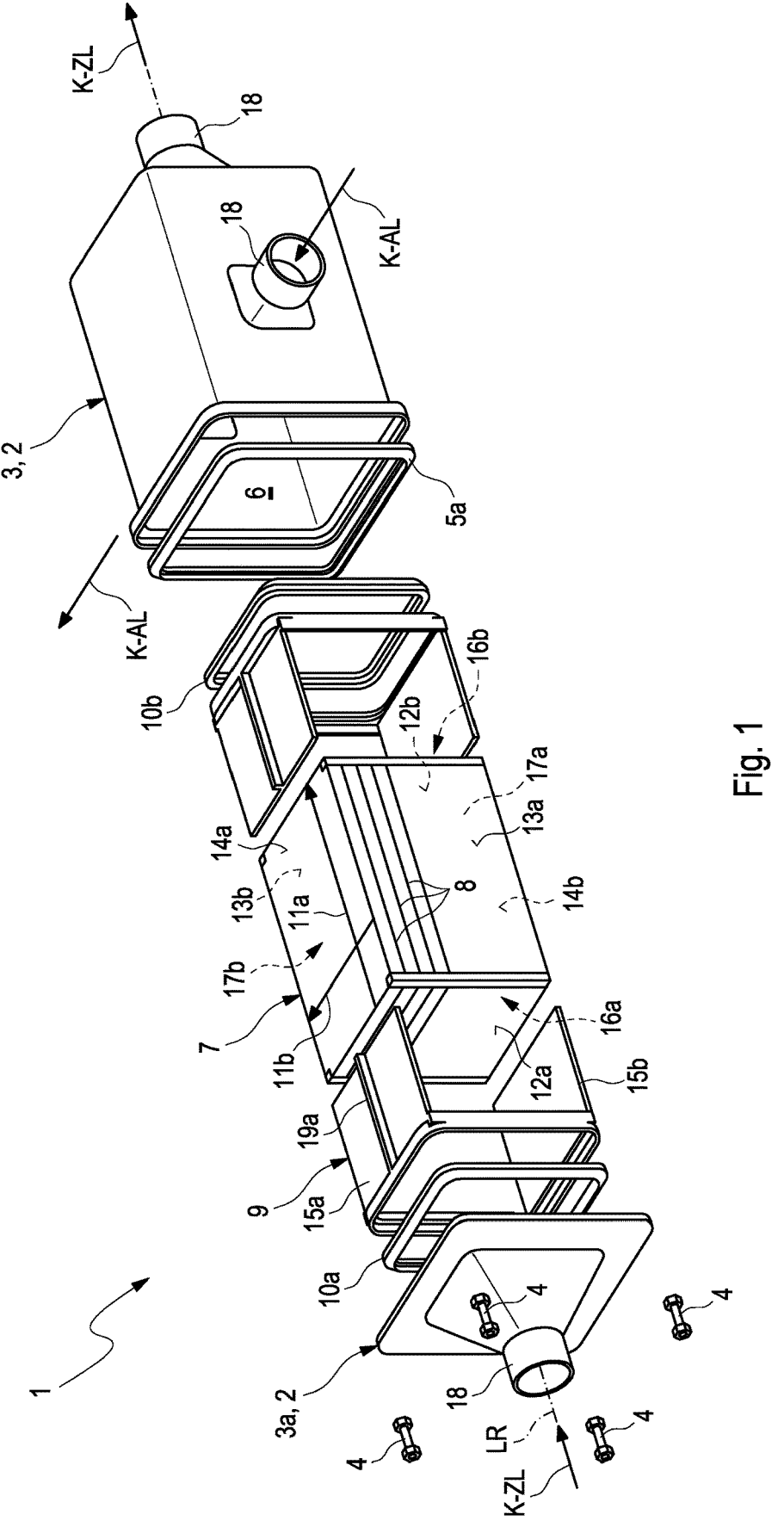
FIG. 1 shows an exploded view of a humidifier in a first embodiment.

FIG. 1 shows an exploded view of a humidifier 1 according to the invention in a first embodiment. The humidifier 1 is provided here for humidifying a dry cathode supply air K-ZL by means of a moist cathode exhaust air K-AL in a fuel cell system—not shown here. The humidifier 1 comprises here a housing 2 which is formed in the first embodiment of the humidifier 1 from a housing body 3 which is open on one side or respectively is pot-shaped or respectively is bucket-shaped, and from a closure lid 3a. The pot-shaped or respectively bucket-shaped housing body 3 and the closure lid 3a are screwed to one another by means of a plurality of screws 4. In addition, an elastic circulating seal 5a—for example of a hardened adhesive composition—is clamped or respectively pressed between the housing body 3 and the closure lid 3a. A housing interior 6 is formed in the housing 2.

The humidifier 1 has in addition a membrane stack 7 of several membranes 8—for clarity here and further, only individual membranes 8 are drawn in the membrane stack 7 —, wherein the membrane stack 7 is inserted in a two-part support frame 9, and the support frame 9 is inserted in the housing interior 6 of the housing 2. The two-part support frame 9 can have a toothing here along a connecting line of the two parts, in order to enable a secure form-fitting connection of the two parts of the support frame 9 to one another. However, it is also conceivable that the two parts of the support frame 9 are securely connected to one another in a different way. Elastic ring seals 10a and 10b—of a hardened adhesive composition, for example—are arranged in a sealing manner between the support frame 9 and the housing 2. The membrane stack 7 is able to be inserted into the housing 2 in the longitudinal direction LR. For this, the pot-shaped housing body 3 is aligned in the longitudinal direction LR, and the closure lid 3a closes the housing body 3 transversely to the longitudinal direction LR. The membrane stack 7 is cuboid-shaped here, wherein a longitudinal axis of the membrane stack 7 and longest edges of the membrane stack 7 are aligned in the longitudinal direction LR. The membrane stack 7 has here six side surfaces 11a and 11b, 12a and 12b, 13a and 13b, lying opposite one another in pairs.

The membranes 8 are configured as foil-like flat membranes and are stacked spaced apart with respect to one another in the membrane stack 7 transversely to the longitudinal direction LR. Supply air channels and exhaust air channels are formed here between the membranes 8.

The supply air channels are associated with a supply air flow path 11a and connect to one another in an air-conducting manner the side surfaces 12a and 12b of the membrane stack 7 which lie opposed to one another and are aligned transversely to the longitudinal direction LR. The exhaust air channels are associated with an exhaust air flow path 11b and connect to one another in an air-conducting manner the side surfaces 13a and 13b of the membrane stack 7 which lie opposed to one another and are aligned parallel to the longitudinal direction LR. The supply air channels of the supply air flow path 11a are separated here from the side surfaces 13a and 13b, and the exhaust air channels of the exhaust air flow path 11b are separated from the side surfaces 12a and 12b, in an airtight manner. The side surfaces 14a and 14b of the membrane stack 7, which lie opposed to one another and are aligned parallel to the longitudinal axis, are hermetically sealed by sealing plates 15a and 15b of the support frame 9. The membranes 8 here are airtight and permeable to water vapour, so that the cathode supply air K-ZL and the cathode exhaust air K-AL flow through the membrane stack 7 free of mixing, and the cathode supply air K-ZL is humidified through the membranes 8 with the cathode exhaust air K-AL.

The moist cathode exhaust air K-AL in the exhaust air flow path 11b tends to a higher pressure loss than the dry cathode supply air K-ZL in the supply air flow path 11a owing to the condensation of water. In the humidifier 1, the supply air flow path 11a is aligned in longitudinal direction LR and is able to be flowed through by cathode supply air K-ZL in longitudinal direction LR. The exhaust air flow path 11b is aligned transversely to the longitudinal direction LR and is able to be flowed through by cathode exhaust air K-AL transversely to the longitudinal direction LR. The side surfaces 13a and 13b which are able to be flowed through have a greater geometric area than the side surfaces 12a and 12b which are able to be flowed through. In addition, the exhaust air flow path 11b within the membrane stack 7 is shorter than the supply air flow path 11a within the membrane stack 7. Thereby, the pressure loss in the wet cathode exhaust air K-AL, tending to pressure loss, can be reduced. As the dry cathode supply air does not tend to any pressure loss, the smaller geometric area of the side surfaces 12a and 12b which are able to be flowed through, and the larger supply air flow path 11a within the membrane stack 7 are noncritical.

Between the respective side surface 12a or respectively 12b, which are able to be flowed through, and the housing 2, an air chamber 16a or respectively 16b is formed for supplying or respectively discharging the cathode supply air K-ZL. Between the respective side surface 13a or respectively 13b and the housing 2 respectively an air chamber 17a or respectively 17b is formed for supplying or respectively discharging the cathode exhaust air K-AL. In addition, four air connecting pieces 18 are formed in the housing 2, which lead into the respective air chambers 16a and 16b, 17a and 17b. The cathode supply air K-ZL and the cathode exhaust air K-AL can flow via the air connecting pieces 18 into or out from the air chambers 16a and 16b, 17a and 17b. The respective air chambers 17a and 17b are sealed with respect to one another by sealing ribs 19a and 19b, which are formed on the sealing plates 15a and 15b and are aligned in the longitudinal direction LR. The air chambers 16a and 16b are sealed from the adjacent air chambers 17a and 17b by the ring seals 10a and 10b. The sealing of the air chambers 16a and 16b, 17a and 17b from one another is therefore particularly simple. In particular, conventional sealing windows in the housing 2 can be dispensed with, and the number of undercuts and of the sliders, necessary in the production of the housing, can be reduced.

Figure 2:
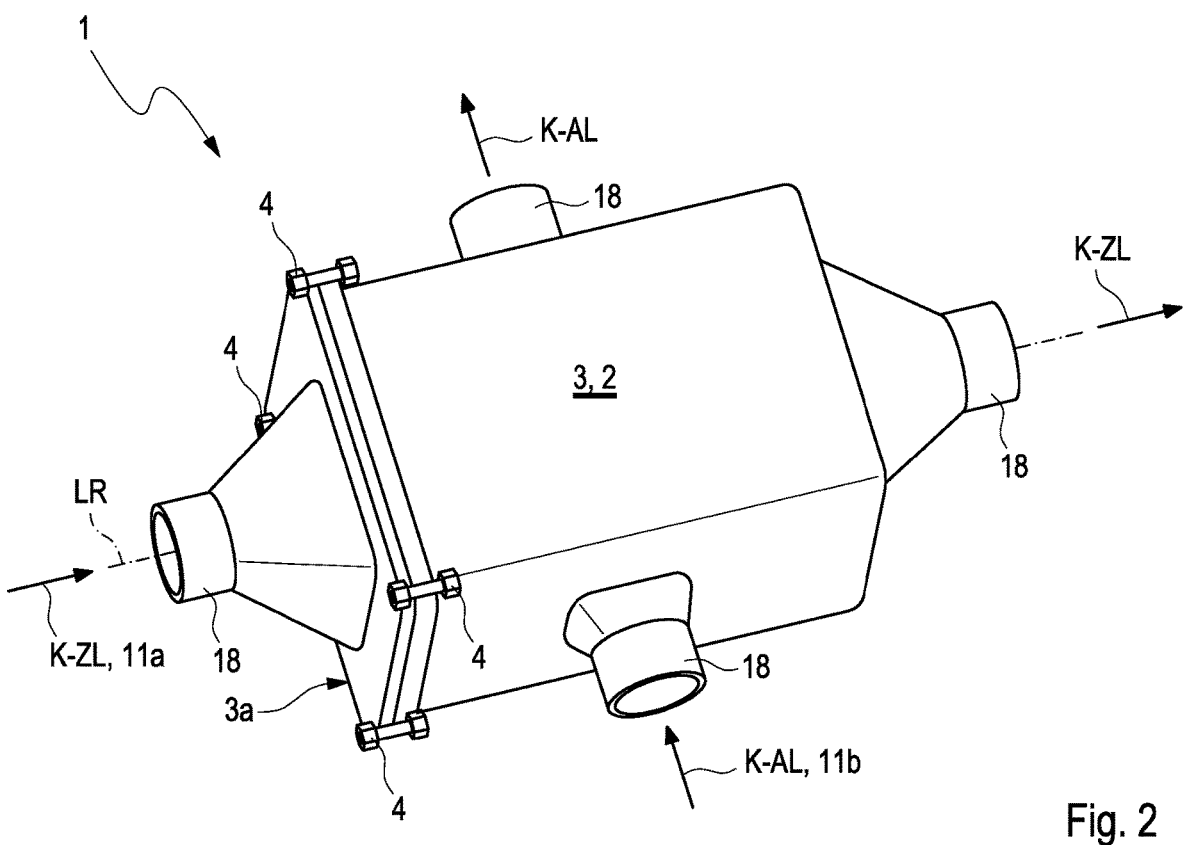
FIG. 2 shows a view of the humidifier according to the invention in the first embodiment.
Figure 3:
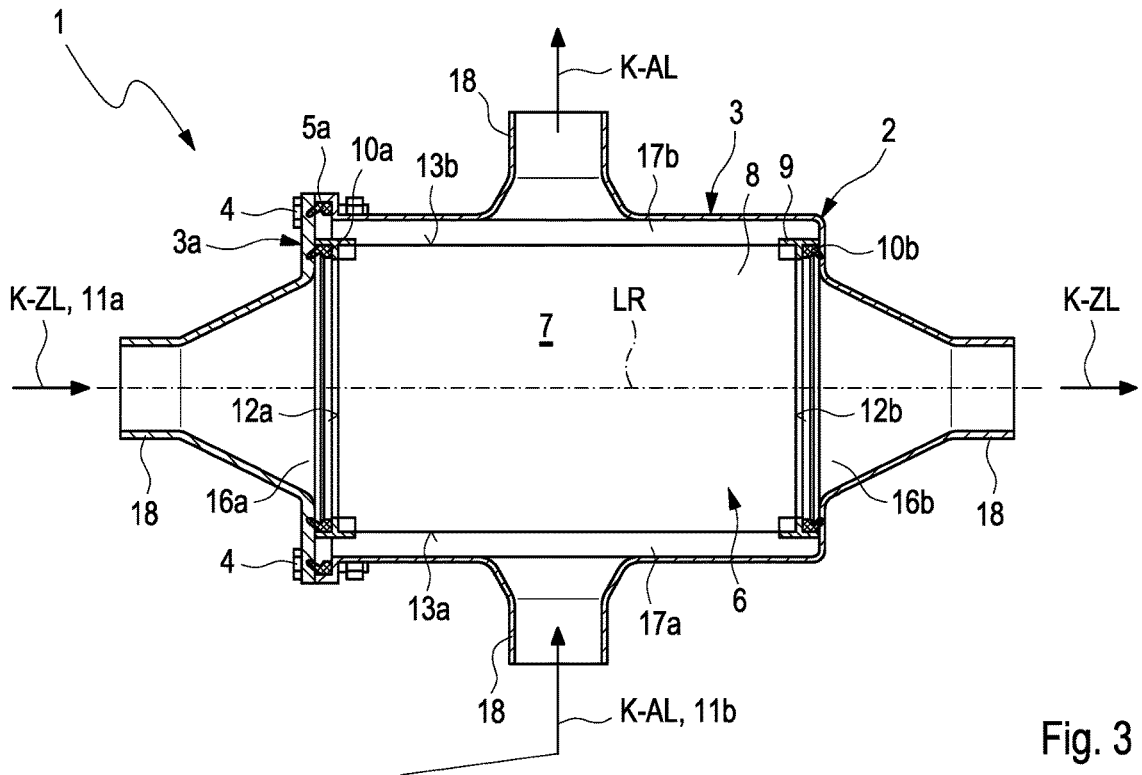
FIGS. 3 to 5 show sectional views of the humidifier according to the invention in the first embodiment in three vertical planes differing from one another.
Figure 4:
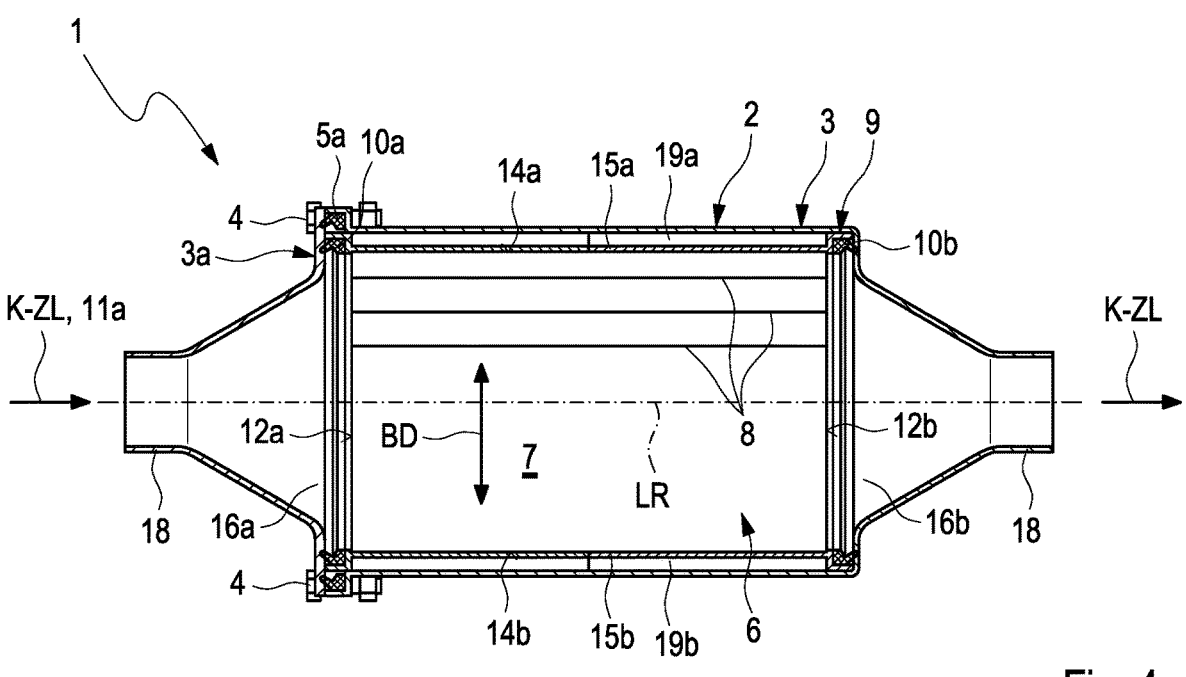
Figure 5:
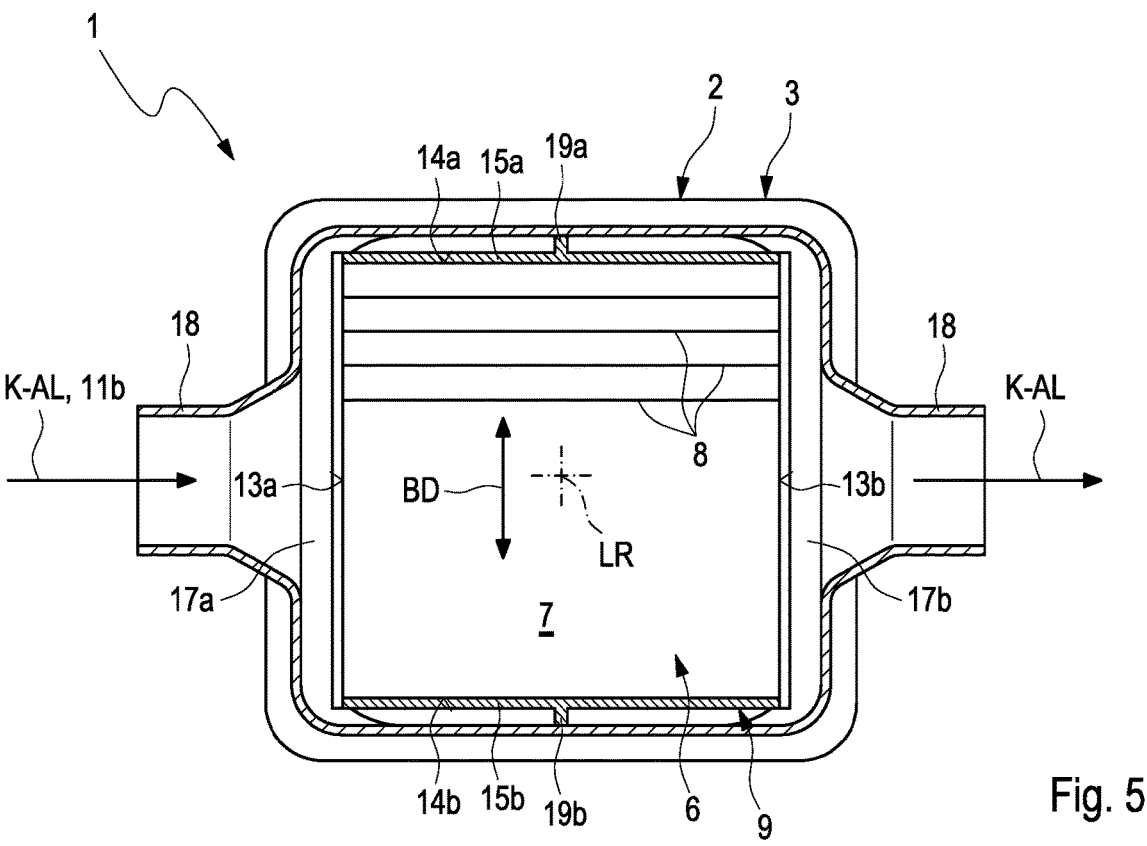

FIG. 2 shows a view of the humidifier 1 in the first embodiment. FIG. 3 shows a sectional view of the humidifier 1 in the first embodiment in a plane which is aligned parallel to individual membranes 8 and parallel to the longitudinal direction LR. FIG. 4 shows a sectional view of the humidifier 1 in the first embodiment in a plane which is aligned transversely to individual membranes 8 and parallel to the longitudinal direction LR. FIG. 5 shows a sectional view of the humidifier 1 in the first embodiment in a plane which is aligned transversely to the longitudinal direction LR.

With reference to FIG. 2 and FIG. 3, the pot-shaped housing body 3 is screwed to the closure lid 3a by means of the screws 4. With reference to FIG. 3, the circulating seal 5a is clamped here between the housing body 3 and the closure lid 3a, so that that the housing body 3 is closed outwardly in an airtight manner. In addition, the two ring seals 10a and 10b are clamped in a sealing manner between the support frame 9 and the housing 2. The ring seal 10a is clamped here in a sealing manner between the support frame and the closure lid 3a, and the ring seal 10b is clamped in a sealing manner between the support frame 9 and the housing body or respectively a base of the housing body 3. The air chambers 16a and 16b are separated by the ring seals 10a and 10b from the adjacent air chambers 17a and 17b in an airtight manner.

With reference to FIG. 4 and FIG. 5, the sealing ribs 19a and 19b lie in an airtight manner on the housing 2 or respectively on the housing body 3 and separate the air chambers 17a and 17b from one another in an airtight manner. The sealing effect is intensified thereby in that the sealing ribs 19a and 19b in operation of the humidifier 1 are pressed in a sealing manner by the inner operating pressure BD—as indicated by arrows—in the membrane stack 7 onto the housing 2 or respectively onto the housing body 3. In operation of the humidifier 1, the flexible membranes 8 deform in the event of a pressure acting on them, and the membrane stack 7 swells outwards. Thereby, the sealing ribs 19a and 19b are pressed onto the housing 2 or respectively onto the housing body 3, and the sealing effect is intensified. It shall be understood that the change in shape of the membrane stack 7 which is described here is small and does not bring about any change to the function and the structure of the membrane stack 7 and/or of the humidifier 1.

Figure 6:
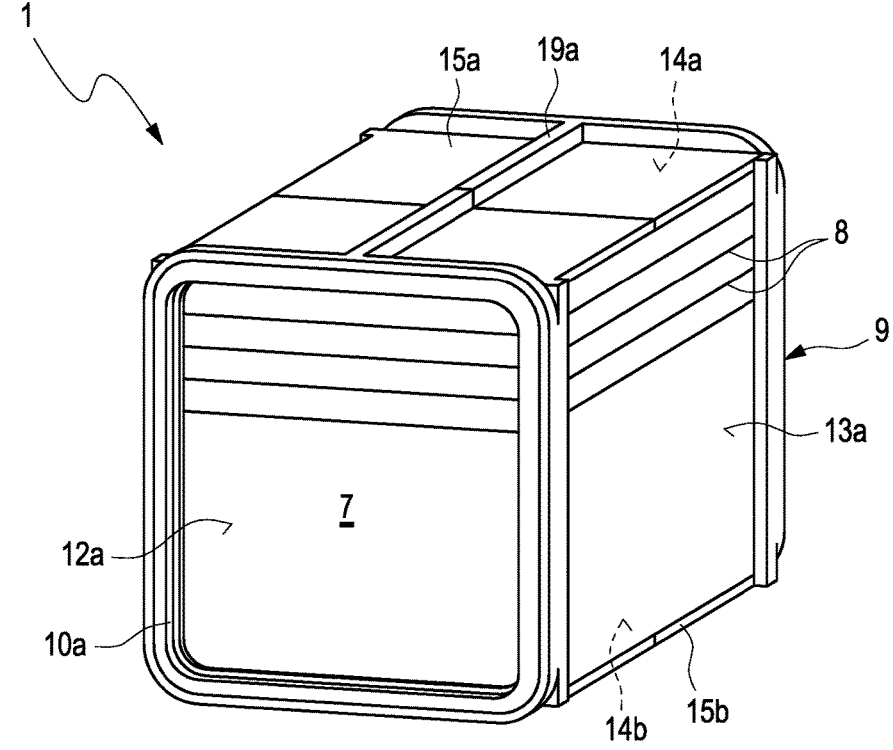
FIG. 6 shows a view of an arrangement of a membrane stack and of a support frame of the humidifier according to the invention in the first embodiment.

FIG. 6 shows a view of the membrane stack 7, which is inserted into the support frame 9 of the humidifier 1 in the first embodiment. In FIG. 6 is can be seen particularly well that the side surfaces 12a and also 12b, 13a and also 13b which are able to be flowed through remain able to be flowed through the support frame 9. The side surfaces 14a and 14b which are not able to be flowed through are closed in an airtight manner by the sealing plates 15a and 15b. The respective ring seals 10a and 10b run here the respective associated side surface 12a and also 12b on the edge side.

Figure 7:
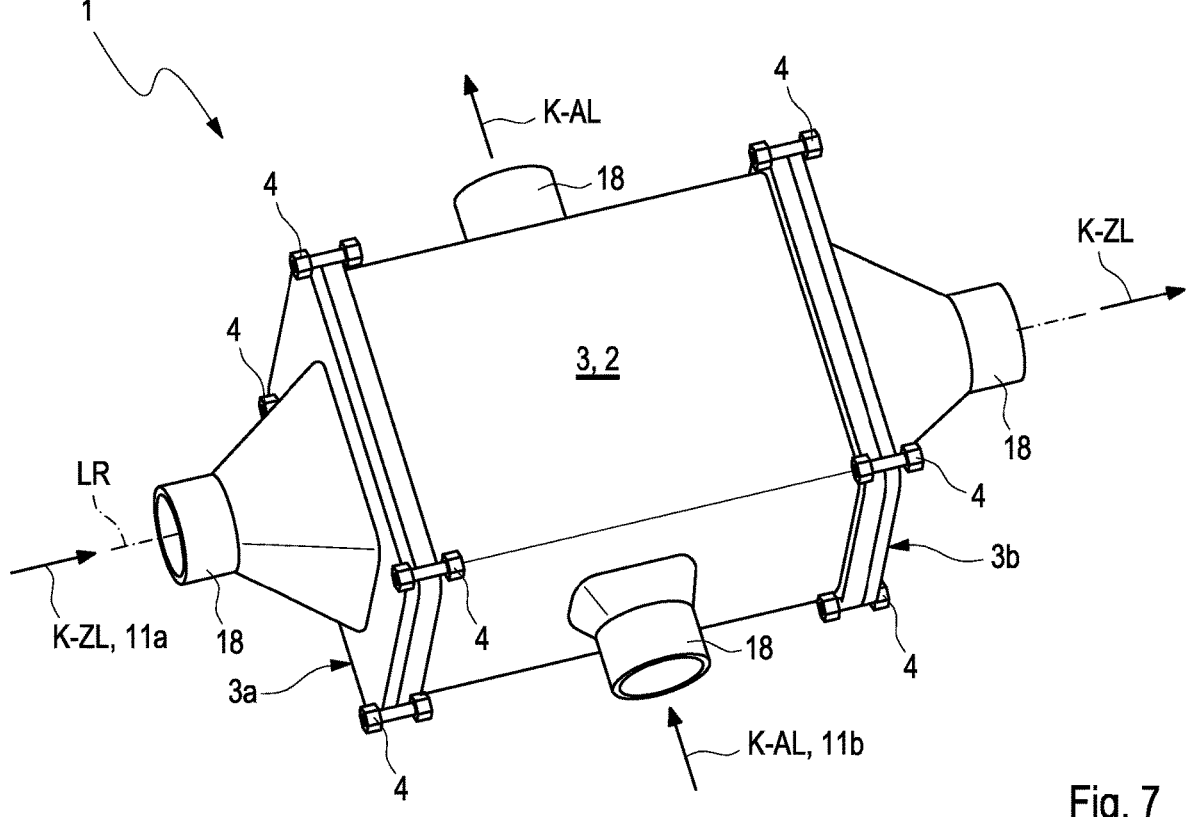
FIG. 7 shows a view of the humidifier according to the invention in a second embodiment.
Figure 8:
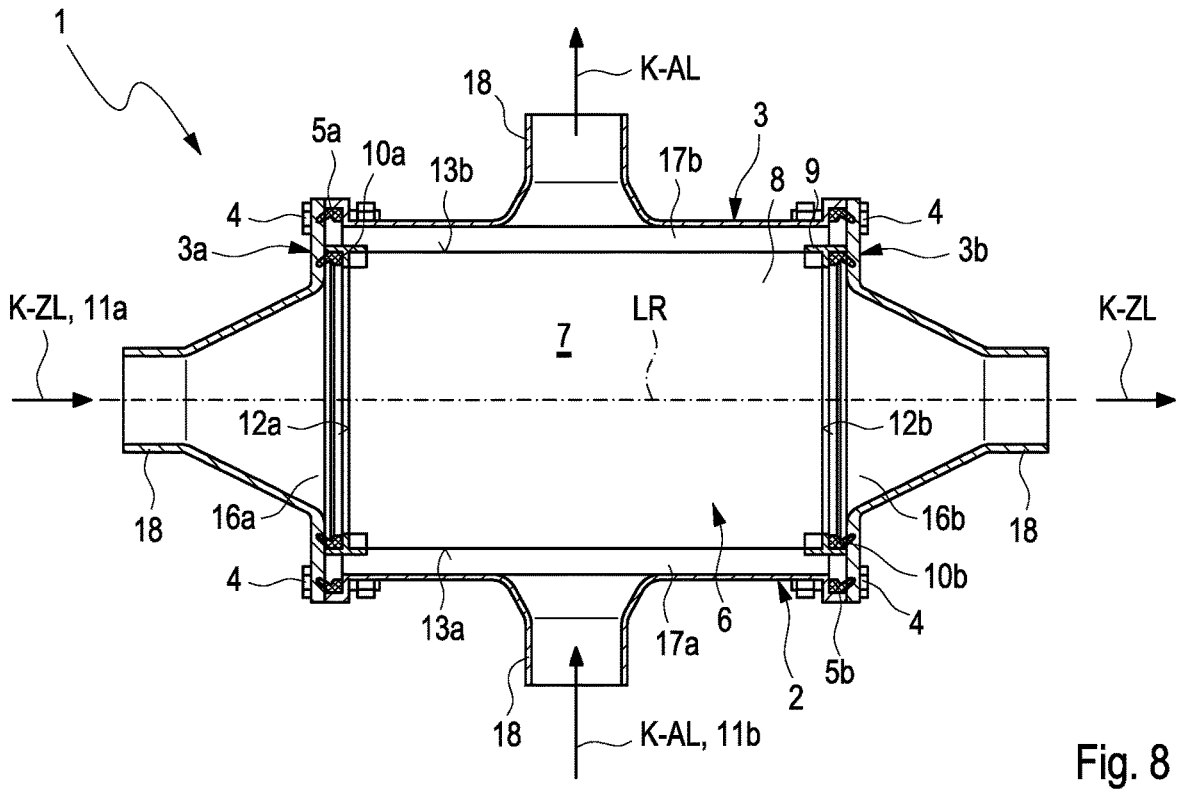
FIGS. 8 and 9 show sectional views of the humidifier according to the invention in the second embodiment in two perpendicular planes differing from one another.
Figure 9:
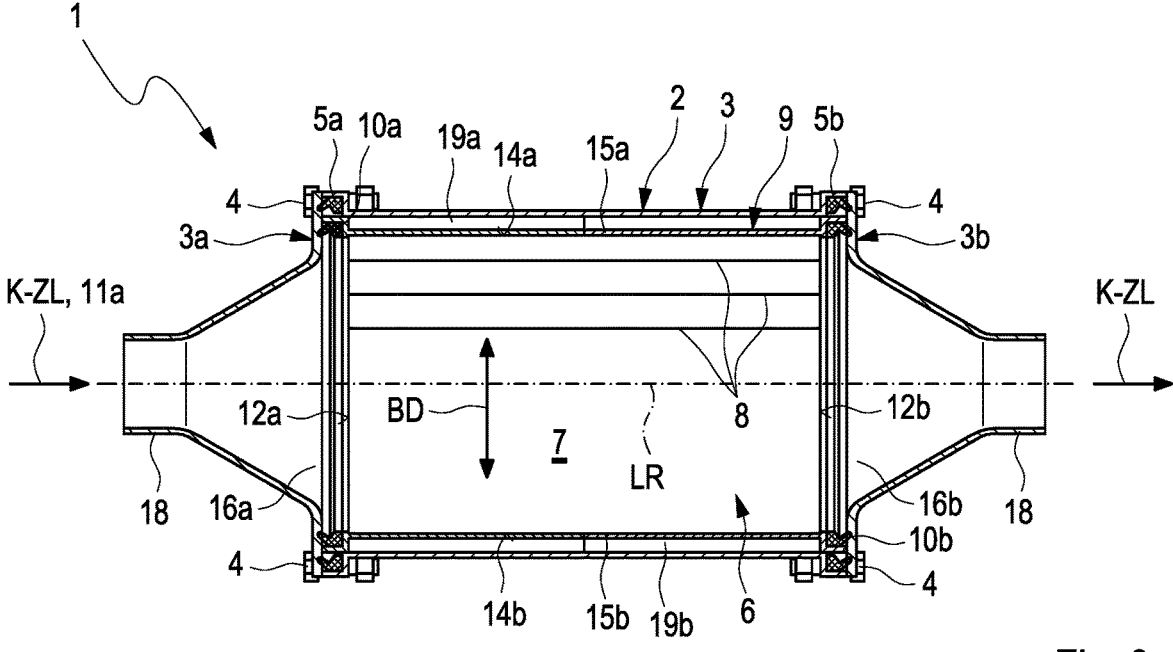

FIG. 7 shows a view of the humidifier 1 according to the invention in a second embodiment. FIG. 8 shows a sectional view of the humidifier 1 in the second embodiment in a plane which is aligned parallel to individual membranes 8 and parallel to the longitudinal direction LR. FIG. 9 shows a sectional view of the humidifier 1 in the second embodiment in a plane which is aligned transversely to individual membranes 8 and parallel to the longitudinal direction LR.

Differently to the first embodiment of the humidifier 1, the humidifier 1 in the second embodiment has the differently configured housing 2. In the second embodiment of the humidifier 1, the housing 2 has the housing body 3 which is open on both sides or respectively is tubular. The housing body 3 is hermetically sealed on one side—as already explained in the first embodiment—by means of the closure lid 3a and of the circulating seal 5a. In an analogous manner thereto, the housing body 3 is hermetically sealed on the other side by means of a closure lid 3b and of a circulating seal 5b. The closure lids 3a and 3b are screwed to the housing body 3 by means of the screws 4, wherein the circulating seals 5a and 5b are clamped in a sealing manner between the closure lid 3a and 3b and the housing body 3. Otherwise, the humidifiers 1 in the first embodiment and in the second embodiment coincide. For this reason, further explanations regarding the second embodiment are dispensed with, and reference is to be made to the above comments regarding FIG. 1-6.

Figure 10:
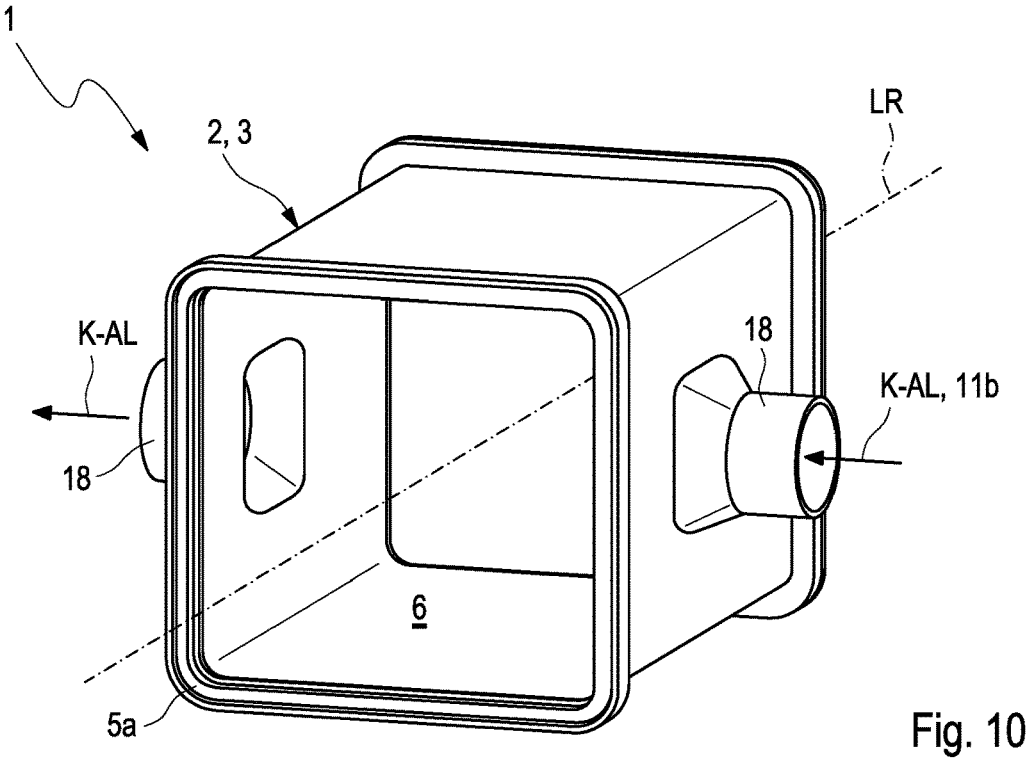
FIG. 10 shows a view of a housing body of the humidifier according to the invention in the second embodiment.
Figure 11:
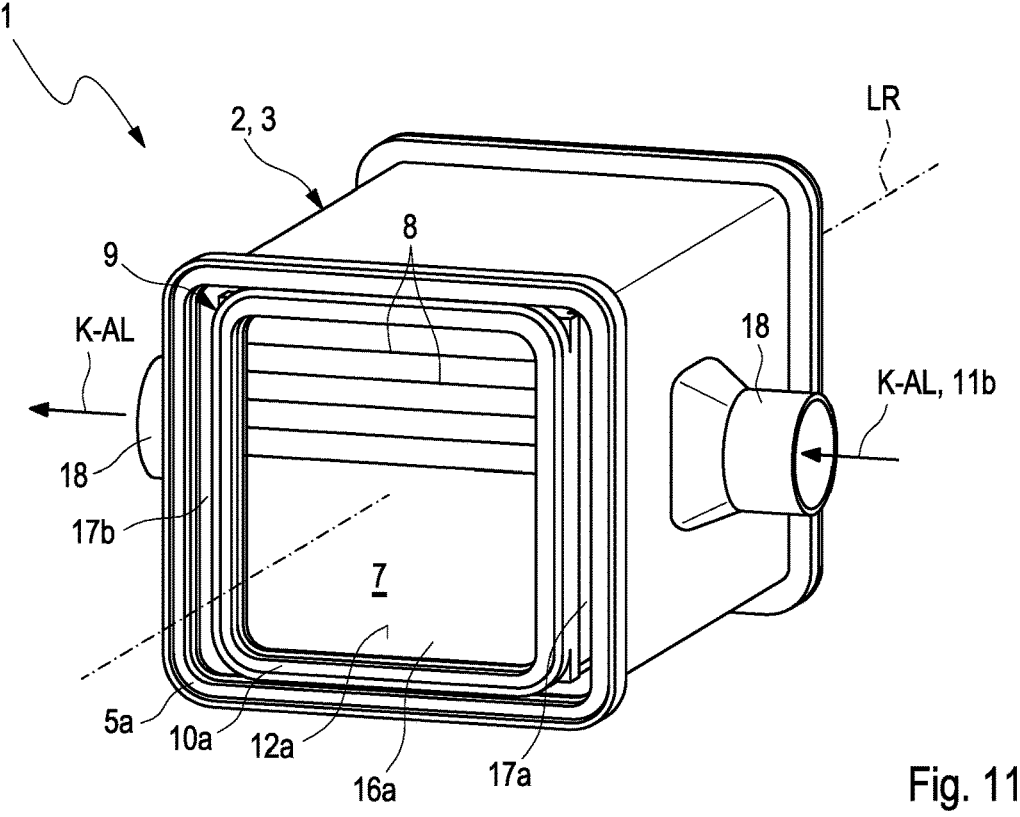
FIG. 11 shows a view of the housing body of FIG. 10 with the arrangement of the membrane and the support frame.

FIG. 10 shows a view of the housing body 3 of the humidifier 1 according to the invention in the second embodiment. Here, the circulating seals 5a and 5b are already mounted into provided grooves of the housing body 3. FIG. 11 shows a view of the housing body 3 of FIG. 10 with the membrane stack 7 and the support frame 9. Here, the membrane stack 7 is already inserted into the support frame 9, and the ring seals 10a and 10b are mounted into provided grooves of the support frame 9. The support body 9 with the inserted membrane stack 7 is inserted here in the housing body 3.

Figure 12:
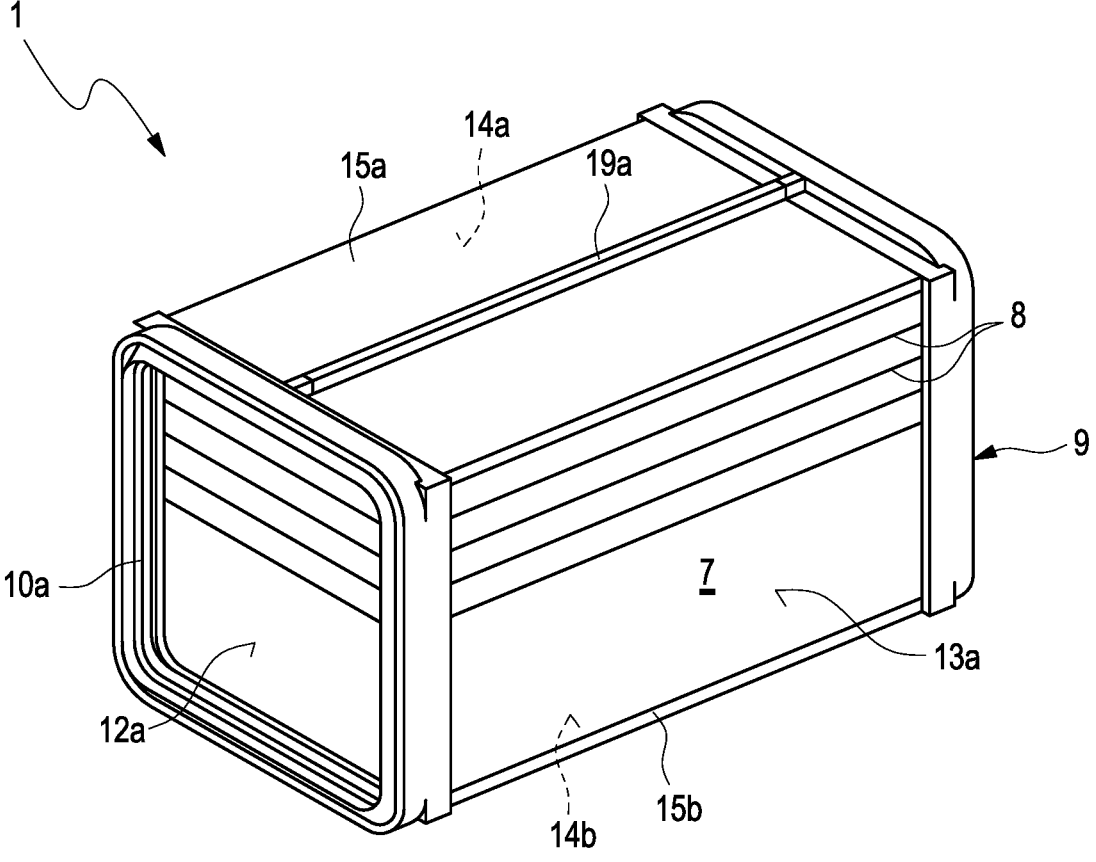
FIG. 12 shows a view of an arrangement of the membrane stack and of the differently configured support frame of the humidifier according to the invention.

FIG. 12 shows a view of an arrangement of the membrane stack 7 and the differently configured support frame 9 of the humidifier 1 according to the invention. The support frame 9 is configured here having four parts. The support frame 9 is divided in two frames surrounding the side surfaces 12a and 12b and the two sealing plates 15a and 15b. The individual parts of the four-part support frame 9 can be securely connected to one another in a form-fitting manner for example by a toothing. However, it is also conceivable that the two parts of the support frame 7 are securely connected to one another in a different manner.

The invention claimed is:

1. A humidifier for humidifying a dry cathode supply air via a moist cathode exhaust air in a fuel cell system, the humidifier comprising: a housing, a membrane stack arranged in a housing interior of the housing, two opposing sealing plates, and a support frame, wherein:

the membrane stack has six side surfaces and is insertable into the housing interior in a longitudinal direction;

two opposing side surfaces of the membrane stack are hermetically sealed;

dry cathode supply air in a supply air flow path is flowable through another two opposing side surfaces of the membrane stack and moist cathode exhaust air in an exhaust air flow path is flowable through two further opposing side surfaces of the membrane stack free of mixing;

a plurality of air chambers are disposed in the housing, the plurality of air chambers each defined between the housing and an associated side surface of the membrane stack through which air is flowable, the plurality of air chambers configured to at least one of (i) supply the cathode supply air in the supply air flow path to the membrane stack, (ii) discharge the cathode supply air in the supply air flow path from the membrane stack, (iii) supply the cathode exhaust air in the exhaust air flow path to the membrane stack, and (iv) discharge the cathode exhaust air in the exhaust air flow path from the membrane stack;

two side surfaces of the membrane stack through which air is flowable are aligned transversely to the longitudinal direction and have a through flow direction extending in the longitudinal direction;

two side surfaces of the membrane stack through which air is flowable are aligned parallel to the longitudinal direction and have a through flow direction extending transversely to the longitudinal direction;

the two opposing side surfaces of the membrane stack which are sealed are aligned parallel to the longitudinal direction;

the two sealing plates are arranged on the two opposing side surfaces of the membrane stack which are sealed;

the membrane stack is disposed in the support frame and the support frame is disposed in the housing;

the side surfaces of the membrane stack through which air is flowable are each connected in an air-conducting manner with an associated air chamber of the plurality of air chambers through the support frame;

the two sealing plates are formed on the support frame; and the two sealing plates are each connected to an associated side surface of the membrane stack in a materially bonded and airtight manner and contact the housing in a sealing manner such that two air chambers of the plurality of air chambers, which are associated with the two side surfaces through which air is flowable that are aligned parallel to the longitudinal direction, are separated from one another in an airtight manner transversely to a circulation direction extending around the longitudinal direction.

2. The humidifier according to claim 1, wherein:
the membrane stack is cuboid-shaped; and
a longitudinal axis of the membrane stack and a plurality of longest edges of the membrane stack are aligned parallel to the longitudinal direction.

3. The humidifier according to claim 1, wherein:
the two side surfaces through which air is flowable that are aligned transversely to the longitudinal direction are associated with the supply air flow path such that the supply air flow path is aligned in the longitudinal direction and the cathode supply air is flowable through the supply air flow path in the longitudinal direction; and
the two side surfaces through which air is flowable that are aligned parallel to the longitudinal direction are associated with the exhaust air flow path such that the exhaust air flow path is aligned transversely to the longitudinal direction and the cathode exhaust air is flowable through the exhaust air flow path transversely to the longitudinal direction.

4. The humidifier according to claim 1, wherein:
the membrane stack includes a plurality of flexible membranes which are deformable when subjected to a pressure; and
each sealing plate of the two sealing plates is configured such that, in operation, the respective sealing plate is (i) deformable via an inner operating pressure in the membrane stack that is higher than an outer pressure and (ii) pressable onto the housing in a sealing manner.

5. The humidifier according to claim 1, wherein:
the membrane stack includes a plurality of flexible membranes which are deformable when subject to a pressure; and
each sealing plate of the two sealing plates is configured in a deformable manner such that, when an inner operating pressure is present in the membrane stack and is higher than an outer pressure, the respective sealing plate is pressable onto the housing in a sealing manner.

6. The humidifier according to claim 1, wherein each sealing plate of the two sealing plates includes at least one sealing rib aligned in the longitudinal direction and contacting the housing in a sealing manner such that the two air chambers associated with the two side surfaces through which air is flowable that are aligned parallel to the longitudinal direction are separated from one another in an airtight manner transversely to the circulation direction.

7. The humidifier according to claim 6, wherein:
the membrane stack includes a plurality of flexible membranes which are deformable when subjected to a pressure; and
each sealing plate of the two sealing plates is configured such that, in operation, the respective sealing plate is (i) deformable via an inner operating pressure in the membrane stack that is higher than an outer pressure and (ii) the respective at least one sealing rib is pressable onto the housing in a sealing manner.

8. The humidifier according to claim 1, further comprising two elastic ring seals, wherein:
the two ring seals each extend around, on an edge side thereof, a respective side surface of the membrane stack through which air is flowable that is aligned transversely to the longitudinal direction; and
the two ring seals are each arranged in a sealing manner one of (i) between the housing and the support frame and (ii) between the housing and the respective side surface, and seals an air chamber of the plurality of air chambers that is associated with the respective side surface from a plurality of adjacent air chambers of the plurality of air chambers.

9. The humidifier according to claim 8, wherein the two ring seals are composed of a hardened adhesive composition.

10. The humidifier according to claim 1, wherein:
the housing includes a housing body which is open on both sides transversely to the longitudinal direction;
the housing further includes two closure lids; and
the housing body is closed respectively axially at a longitudinal end side via the two closure lids.

11. The humidifier according to claim 10, further comprising two elastic circulating seals each arranged in a sealing manner between the housing body and a respective closure lid of the two closure lids.

12. The humidifier according to claim 11, wherein the two circulating seals are composed of a hardened adhesive composition.

13. The humidifier according to claim 1, wherein:
the housing includes a housing body which is open on one side transversely to the longitudinal direction;

the housing further includes a closure lid; and the housing body is closed axially at a longitudinal end side via the closure lid.

14. The humidifier according to claim 13, further comprising an elastic circulating seal arranged in a sealing manner between the housing body and the closure lid.

15. The humidifier according to claim 14, wherein the circulating seal is composed of a hardened adhesive composition.

16. A humidifier for humidifying a dry cathode supply air via a moist cathode exhaust air in a fuel cell system, the humidifier comprising: a housing, a support frame disposed in the housing, and a membrane stack disposed in the support frame and arranged in a housing interior of the housing, wherein:

dry cathode supply air in a supply air flow path and moist cathode exhaust air in an exhaust air flow path are flowable through the membrane stack without mixing with one another;

the membrane stack is insertable into the housing interior in a longitudinal direction;

the membrane stack has a first side surface, a second side surface disposed opposite the first side surface, a third side surface, a fourth side surface disposed opposite the third side surface, a fifth side surface, and a sixth side surface disposed opposite the fifth side surface;

the first side surface and the second side surface of the membrane stack extend transversely to the longitudinal direction and the cathode supply air in the supply air flow path is flowable through the first side surface and the second side surface of the membrane stack in the longitudinal direction;

the third side surface and the fourth side surface of the membrane stack extend parallel to the longitudinal direction and the cathode exhaust air in the exhaust air flow path is flowable through the third side surface and the fourth side surface of the membrane stack transversely to the longitudinal direction;

the fifth side surface and the sixth side surface of the membrane stack extend parallel to the longitudinal direction and are hermetically sealed;

a plurality of air chambers are disposed in the housing, the plurality of air chambers including (i) a first air chamber defined between the first side surface of the membrane stack and the housing via which the cathode supply air in the supply air flow path is suppliable to the membrane stack, (ii) a second air chamber defined between the second side surface of the membrane stack and the housing via which the cathode supply air in the supply air flow path is dischargeable from the membrane stack, (iii) a third air chamber defined between the third side surface of the membrane stack and the housing via which the cathode exhaust air in the exhaust air flow path is suppliable to the membrane stack, and (iv) a fourth air chamber defined between the fourth side surface of the membrane stack and the housing via which the cathode exhaust air in the exhaust air flow path is dischargeable from the membrane stack;

the support frame includes two sealing plates, the two sealing plates including a first sealing plate and a second sealing plate arranged on the fifth side surface and the sixth side surface of the membrane stack, respectively;

the first side surface, the second side surface, the third side surface, and the fourth side surface of the membrane stack are connected in an air-conducting manner to the first air chamber, the second air chamber, the third air chamber, and the fourth air chamber, respectively, through the support frame; and the two sealing plates are connected to the fifth side surface and the sixth side surface of the membrane stack in a materially bonded and airtight manner and contact the housing in a sealing manner such that the third air chamber and the fourth air chamber are separated from one another in an airtight manner transversely to a circulation direction extending around the longitudinal direction.

17. The humidifier according to claim 16, wherein the membrane stack is cuboid-shaped and has a longitudinal axis extending parallel to the longitudinal direction.

18. The humidifier according to claim 16, wherein the membrane stack includes a plurality of flexible membranes that are deformable via pressure.

19. The humidifier according to claim 16, wherein the two sealing plates are configured such that, when an inner operating pressure in the membrane stack is higher than an outer pressure, the two sealing plates deform and press against the housing in a sealing manner.

20. The humidifier according to claim 16, wherein the two sealing plates each include a sealing rib extending in the longitudinal direction and contacting the housing in a sealing manner.

* * * * *